US010413975B2

(12) United States Patent
Wagner, III (10) Patent No.: US 10,413,975 B2
(45) Date of Patent: Sep. 17, 2019

(54) TARGETING SYSTEM FOR PORTABLE DRILL PRESS

(71) Applicant: Fred A. Wagner, III, Charlotte, NC (US)

(72) Inventor: Fred A. Wagner, III, Charlotte, NC (US)

(*) Notice: Subject to any disclaimer, the term of this patent is extended or adjusted under 35 U.S.C. 154(b) by 0 days.

(21) Appl. No.: 15/825,152

(22) Filed: Nov. 29, 2017

(65) Prior Publication Data

US 2018/0154458 A1 Jun. 7, 2018

Related U.S. Application Data

(60) Provisional application No. 62/428,594, filed on Dec. 1, 2016.

(51) Int. Cl.
| | |
|---|---|
| *B23B 51/00* | (2006.01) |
| *B25H 1/00* | (2006.01) |
| *B23B 45/00* | (2006.01) |
| *B23B 47/28* | (2006.01) |
| *B23B 49/02* | (2006.01) |
| *B23B 51/04* | (2006.01) |

(52) U.S. Cl.
CPC ........ *B23B 51/0054* (2013.01); *B23B 45/003* (2013.01); *B23B 47/28* (2013.01); *B23B 49/02* (2013.01); *B25H 1/0064* (2013.01); *B25H 1/0078* (2013.01); *B23B 51/04* (2013.01); *B23B 2270/34* (2013.01); *Y10S 408/712* (2013.01); *Y10T 408/564* (2015.01); *Y10T 408/568* (2015.01); *Y10T 408/5647* (2015.01); *Y10T 408/6786* (2015.01)

(58) Field of Classification Search
CPC ... B23B 45/003; B23B 47/28; B23B 51/0054; B23B 49/02; B25H 1/0064; B25H 1/0078; Y10S 408/712; Y10T 408/564; Y10T 408/5647
See application file for complete search history.

(56) References Cited

U.S. PATENT DOCUMENTS

| | | | |
|---|---|---|---|
| D55,387 S | 6/1920 | Leckinger | |
| D158,021 S | 4/1950 | Stanland | |
| 2,622,638 A * | 12/1952 | Sanders | B27F 5/10 144/78 |

(Continued)

FOREIGN PATENT DOCUMENTS

| | | | |
|---|---|---|---|
| CH | 551246 A | * | 7/1974 |
| DE | 2812296 A | * | 10/1979 |

(Continued)

*Primary Examiner* — Eric A Gates
(74) *Attorney, Agent, or Firm* — Hammer & Associates, P.C.

(57) ABSTRACT

A targeting tool releasably holds a portable drill press on a work piece while drilling a hole in the work piece. The portable drill press includes a tubular column with an open bottom end and a mechanical advantage device. The mechanical advantage device moves a drill up and down along the tubular column. A targeting base includes a base for releasable engagement with the work piece, an upstanding post affixed to the base that is adapted for engagement with the open end of the tubular column, and optionally, a drill guide in the base through which a drill bit passes as the drill moves up and down along the tubular column.

9 Claims, 7 Drawing Sheets

(56) References Cited

U.S. PATENT DOCUMENTS

| | | | | |
|---|---|---|---|---|
| 2,737,065 | A * | 3/1956 | Piersall | B25H 1/0042 408/712 |
| 2,835,147 | A * | 5/1958 | Baifour, Jr. | B25H 1/0042 408/99 |
| 2,879,678 | A * | 3/1959 | Kaiser, Jr. | B23Q 3/1543 408/236 |
| 2,973,673 | A * | 3/1961 | Grau | B25H 1/0064 408/712 |
| 3,060,769 | A * | 10/1962 | Heider | B25H 1/0064 192/107 T |
| 4,235,565 | A * | 11/1980 | Albano | B23B 47/288 144/104 |
| 4,442,905 | A * | 4/1984 | Agoston | B25H 1/0035 173/36 |
| 4,740,119 | A * | 4/1988 | Lierz | B25H 1/0064 408/111 |
| 5,137,235 | A * | 8/1992 | Wentworth | B25H 1/0035 248/124.1 |
| 5,681,022 | A * | 10/1997 | Rankin | F16B 47/00 248/205.9 |
| 5,713,702 | A * | 2/1998 | Turner | B23B 41/006 408/100 |
| 5,899,644 | A * | 5/1999 | Buck | B25H 1/0078 408/110 |
| 5,993,122 | A * | 11/1999 | Baker | B08B 15/04 408/112 |
| D454,479 | S | 3/2002 | Kolpin | |
| 6,692,201 | B2 * | 2/2004 | Soderman | B25H 1/0064 408/111 |
| 6,776,562 | B2 * | 8/2004 | Morrison | B23B 49/026 408/130 |
| D511,667 | S | 11/2005 | Jones | |
| D640,113 | S | 6/2011 | Krohmer et al. | |
| D655,593 | S | 3/2012 | Wagner, III et al. | |

FOREIGN PATENT DOCUMENTS

| | | | | |
|---|---|---|---|---|
| DE | 4035644 | A1 * | 5/1992 | B25H 1/0057 |
| FR | 643032 | A * | 9/1928 | B25H 1/0042 |
| GB | 2243568 | A * | 11/1991 | B25H 1/0064 |
| JP | 09290403 | A * | 11/1997 | |
| JP | 2002160110 | A * | 6/2002 | |

* cited by examiner

TARGETING SYSTEM FOR PORTABLE DRILL PRESS

RELATED APPLICATION

This application claims the benefit of U.S. Provisional Application No. 62/428,594 filed Dec. 1, 2016.

FIELD OF THE INVENTION

The invention is directed to a targeting system for a portable drill press.

BACKGROUND OF THE INVENTION

Drilling a hole in a work piece, such as a structural member (metal, wood, or cementitious material), pipe (metal, plastic, or cementitious material), and/or flat member (metal, wood, plastic, or cementitious material), can be difficult. The difficulty may manifest itself as: holding the work piece and drill together while drilling, ensuring the drill is correctly aligned (e.g., plumb) with respect to the work piece, applying uniform pressure to the drill while drilling, and making uniform holes when drilling multiple holes in the work piece, to name a few.

Often, drilling, such a hole, must be done in the field (or job site) using a portable drill press. One such drill press is disclosed in U.S. D655593, incorporated herein by reference. Holding the work piece and the drill press together, at the proper angle, and then exerting the necessary pressure to drill through the work piece can be difficult, especially for a single worker. These complications are magnified if the hole must be drilled in an elevated work piece or if a hole, other than vertical, must be drilled.

There is a need for a targeting tool that may be used with a portable drill press that overcomes one or more of the above mentioned difficulties. Moreover, the targeting tool should allow the hole to be drilled by a single worker.

SUMMARY OF THE INVENTION

A targeting tool releasably holds a portable drill press on a work piece while drilling a hole in the work piece. The portable drill press includes a tubular column with an open bottom end and a mechanical advantage device. The mechanical advantage device moves a drill up and down along the tubular column. A targeting base includes a base for releasable engagement with the work piece, an upstanding post affixed to the base that is adapted for engagement with the open end of the tubular column, and optionally, a drill guide in the base through which a drill bit passes as the drill moves up and down along the tubular column.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
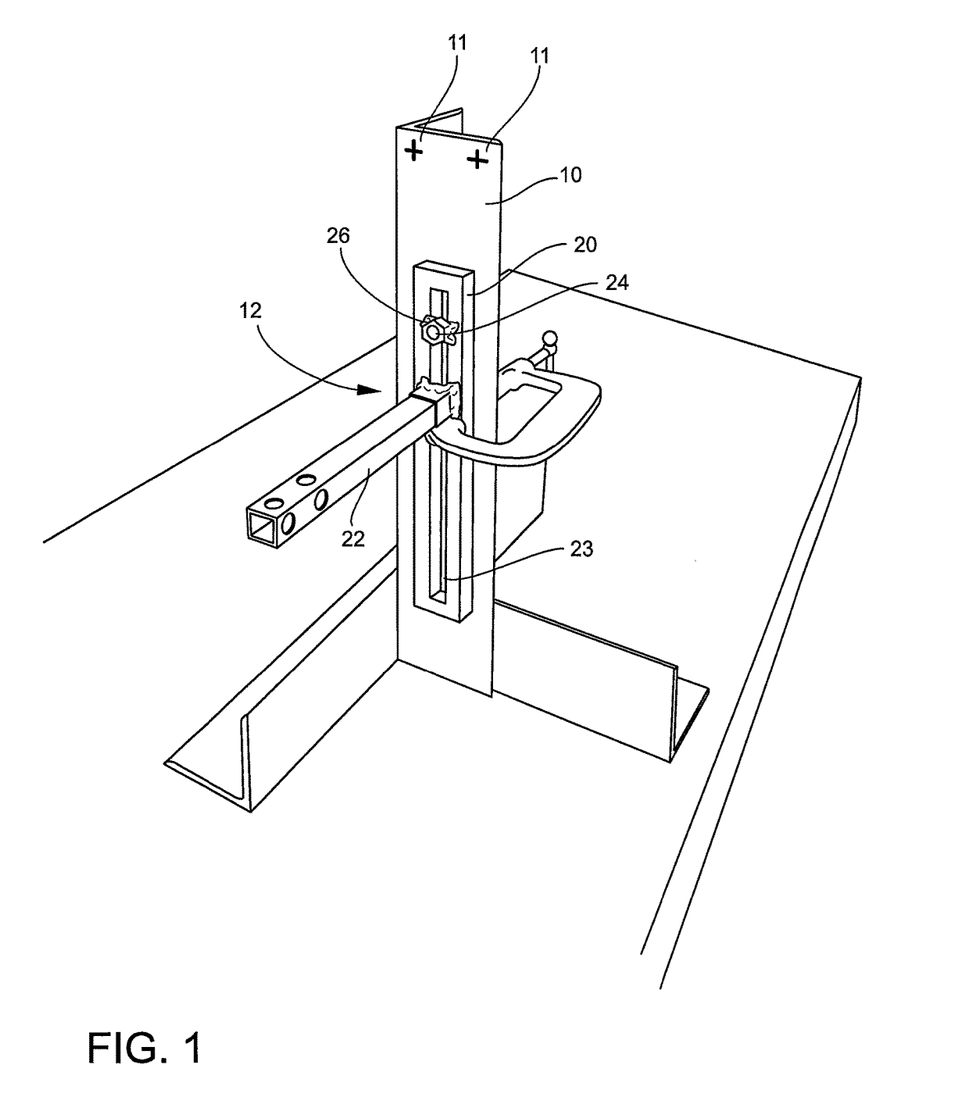
FIG. 1 is an isometric view of an embodiment of the targeting base affixed to a work piece without the portable drill press.
Figure 2:
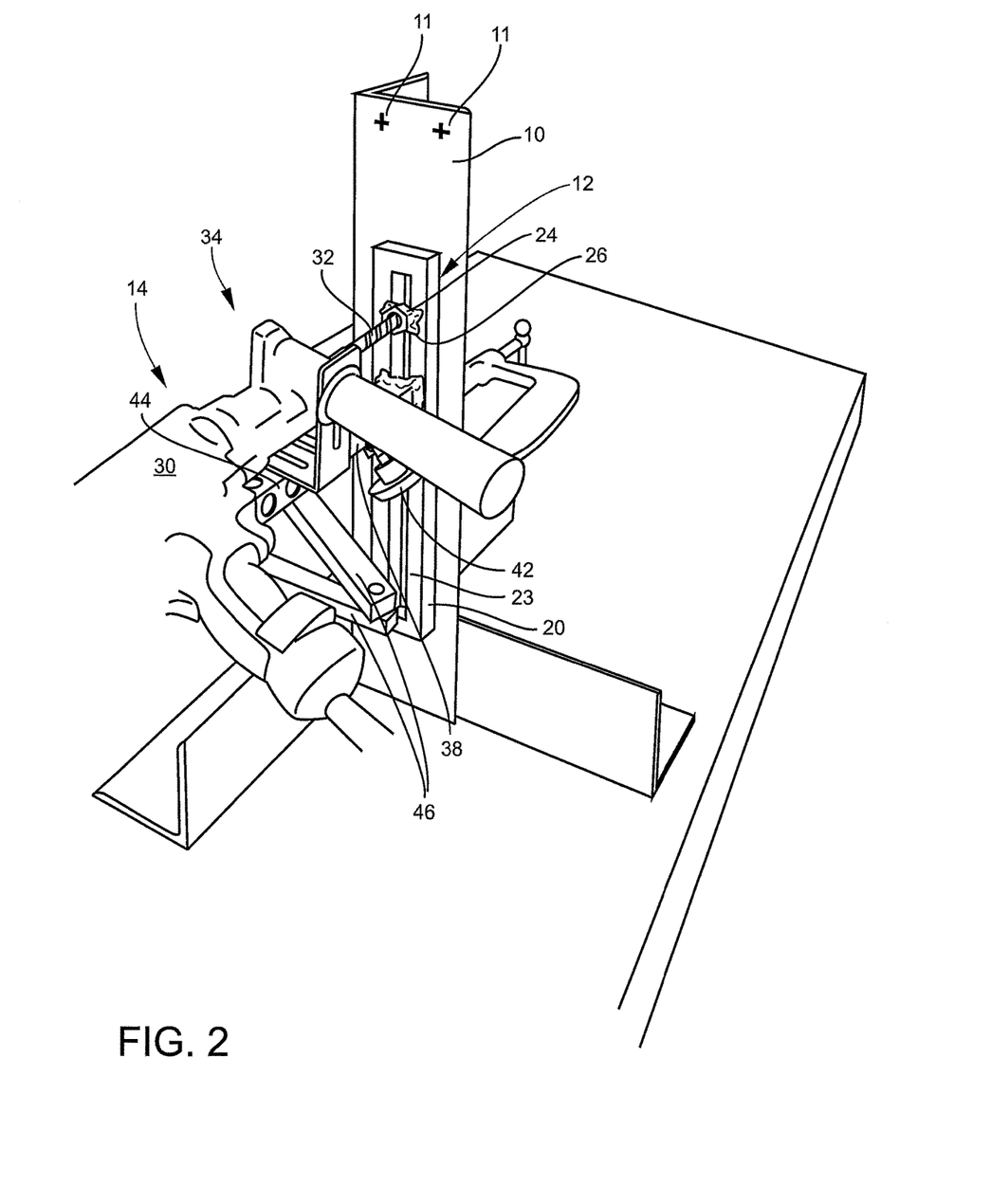
FIG. 2 is an isometric view of the embodiment of the targeting base affixed to a work piece, shown in FIG. 1, with a portable drill press.
Figure 3:
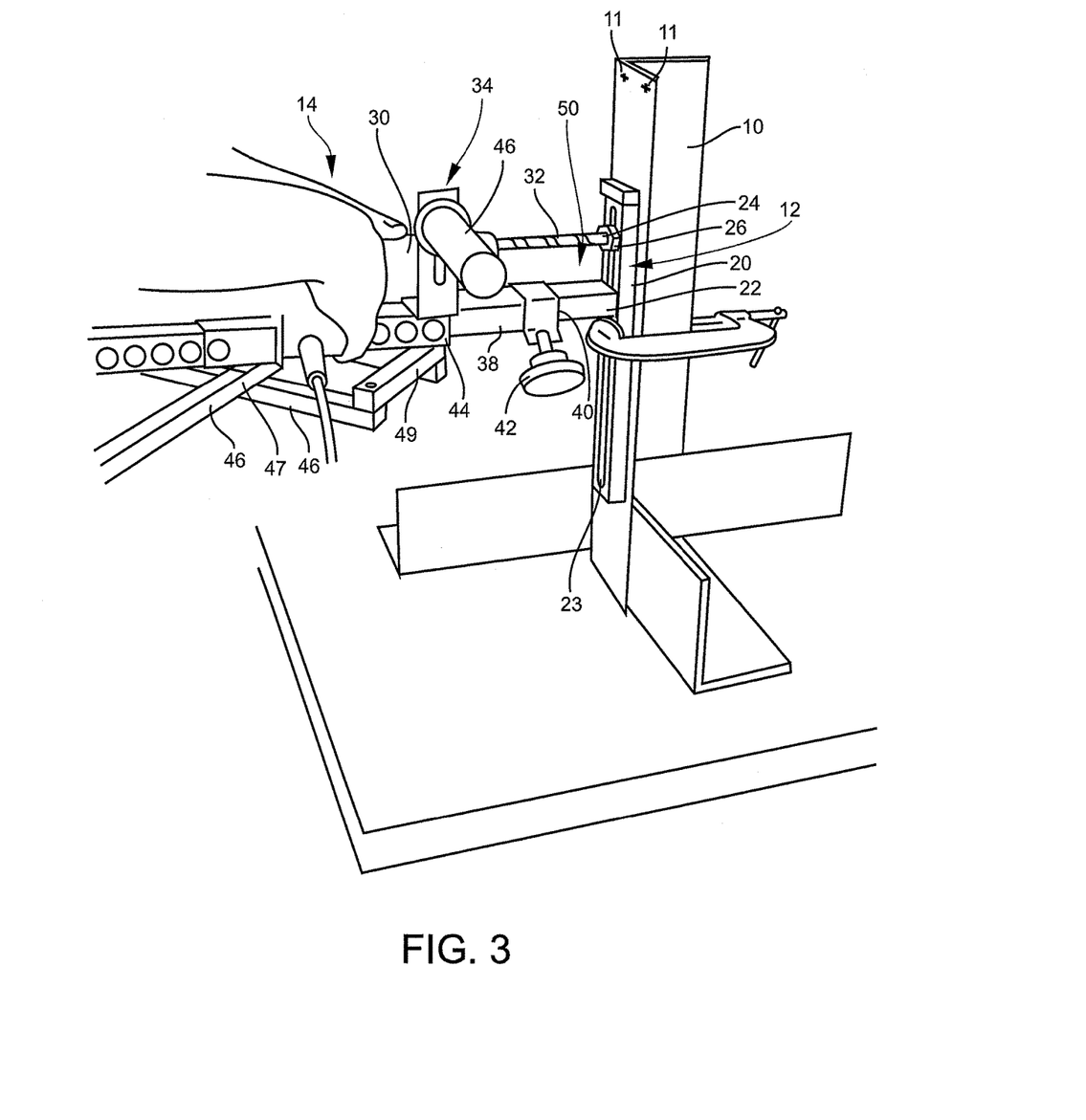
FIG. 3 is a side view of the embodiment shown in FIG. 2.

Referring to the drawings, where like elements have like numerals, there is shown, in FIG. 1, an embodiment of the targeting tool 12 releasably affixed (e.g., clamped) to a work piece 10, the portable drill press is not shown. The work piece 10, portable drill press 14, and the targeting tool 12 will be discussed in greater detail below.

Work piece 10 may be any work piece. Such work pieces may be, for example, structural members, tubular members, and/or flat members. The work piece may be made of any material, such as metal (e.g., steel, iron, aluminum), wood (e.g., solid, laminated, flake, particle, composite), plastic (e.g., solid, laminate, composite), cementitious material (e.g., cement, concrete, gypsum), ceramic, and/or stone. Structural members may be any structural member, such as angle members, channel members, box members, I-beams, bars, billets, tubular members. Tubular members may be any tubular member, such as pipes, conduits, water/sewer lines.

Portable drill press 14 may be any drill press. The drill press 14 generally includes a drill 30 with a drill bit 32, a drill mount 34, and a mechanical advantage device 36. With the instant invention, the drill press 14 further includes a mechanism 50 for interconnecting the drill press 14 with the targeting tool 12. In one embodiment, the portable drill press 14 may be the drill press shown in U.S. D655593, incorporated herein by reference. This drill press 14 generally includes: a tubular column 38 having a square, circular, or rectangular cross-section and having an open bottom end 40 and a column clamp 42 located adjacent the open end 40; a slide 44 fits over the tubular column 38 for moving up and down along the length of the tubular column 38, the slide 44 having a slot (not shown) extending along a length of the slide, but this slot does not extend the entire length of the slide, the slide 44 having a front face and a rear face; a drill mount 34 disposed on a front face of the slide 44 and including a fixed bracket 46 and a mount clamp (not shown), the mount clamp is located above the fixed bracket 46, whereby the drill 30 is removably mounted between the mount clamp and the fixed bracket 46 with the drill bit 32 pointed in a direction of the open end 40; and a mechanical advantage device 36 disposed on the rear face of the slide 44, the mechanical advantage device 36 moves the slide up and down along the tubular column 38, the mechanical advantage device 36 has a pair of lever arms 46, a first pivot 47 fixedly interconnecting the pair of lever arms 46 to the tubular column 38 through the slot in the slide 44, and a second pivot 49 fixedly interconnection the lever arms 46 to the slide 44 below the slot in the slide 44, whereby moving the lever arms 46 moves the slide 44 up and down along the column 38.

Targeting tool 12 (and the drill press 14) may be releasably affixed to work piece 10 in any conventional manner. Such temporary mounting may be, for example: clamping (see FIGS. 1-5), temporary mounting, e.g., screws/bolts in to the work piece or gluing (see FIGS. 4 and 9), clasps (see FIGS. 6-7), welding (that is subsequently cut or ground to release), magnetically (the base may be magnetic or include a magnet), or combinations thereof.

Targeting tool 12 is used to: position the drill press 14 over the work piece 10 at the place of a desired hole 11; temporarily (i.e., during drilling) connected the drill press 14 to the work piece 10; and ensure that uniform pressure can be maintained on the drill bit 32 during drilling.

Targeting tool 12 generally includes: a base 20 for releasable engagement with the work piece 10; a post 22 affixed to the base, the post 22 is adapted to sliding engagement within the open end 40 of the tubular column 38 and the column clamp 42 releasably fixing the post 22 in the tubular column 38; and, optionally, a drill guide 24 may be a hole in the base 20 through which the drill bit 32 passes as the slide 44 moves up and down along the tubular column 38. The targeting tool 12 may further include: a guide bushing 26 affixed (e.g., welded, glued) to the base 22, and located between the base 20 and the drill 30. The post 22 may be tubular or solid. The post 22 may be at any angle to the base. In one embodiment, post 22 is standing upright (e.g., 90°) on the base. Tool 12 may have more than one post 22 (see FIGS. 5-7); and/or may have more than one drill guide 24 (see FIGS. 6-8). Several embodiments of the targeting tool 12 are discussed hereinafter.

Figure 4:
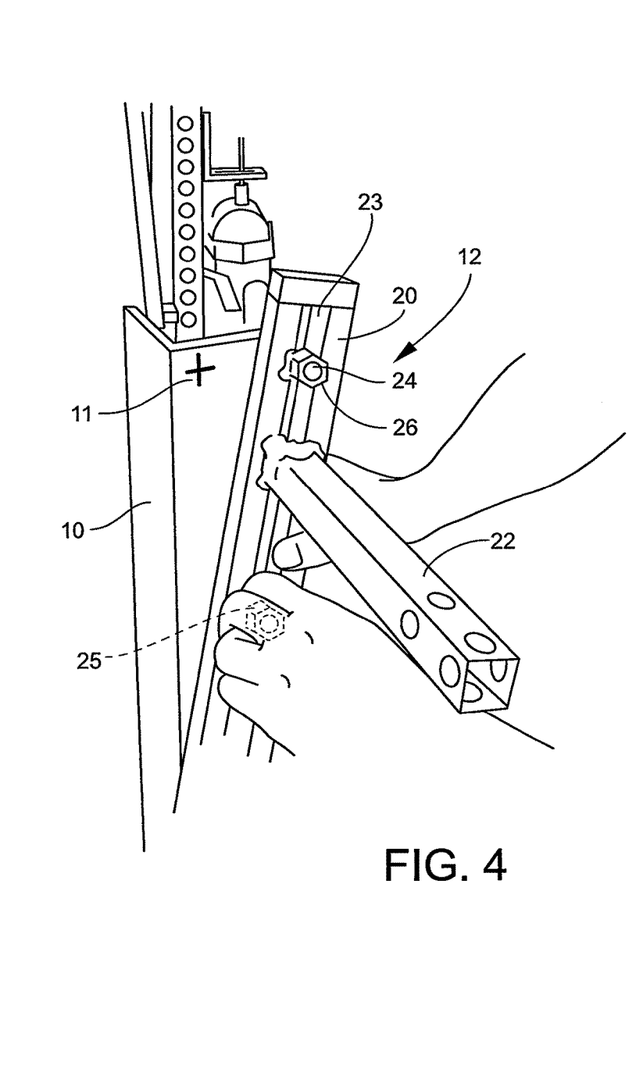
FIG. 4 shows how the embodiment, shown in FIGS. 1-3, may be used.

In FIGS. 1-4, a first embodiment of the targeting tool 12 is illustrated. In this embodiment, the base 20 includes a base slot 23 and the post 22 straddles the base slot 23, and the base slot 23 receives a work piece clamp that releasably affixes the base to the work piece 10. In FIG. 4, a pivot 25 may be used to swing base 20 over different desired holes 11.

Figure 5:
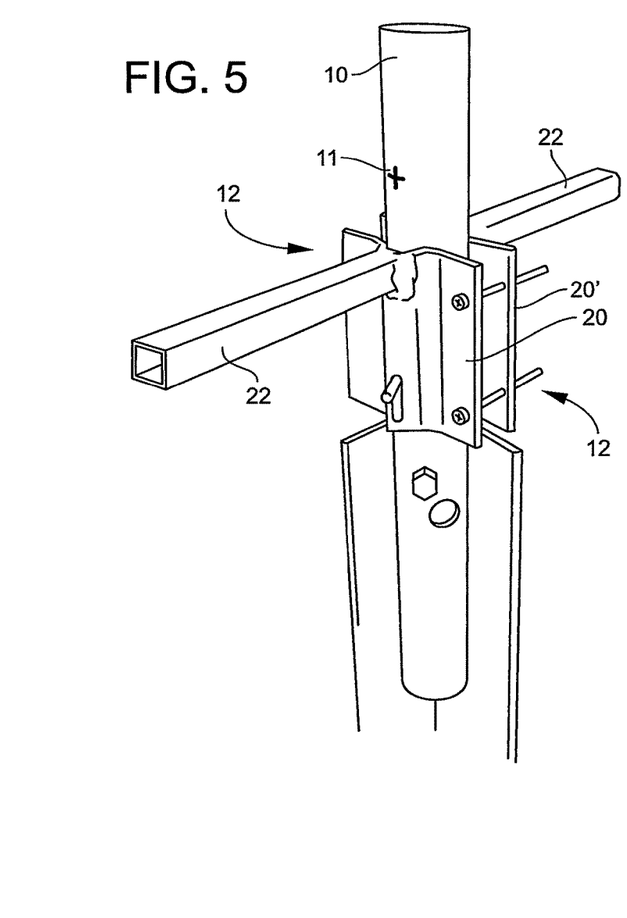
FIG. 5 shows another embodiment of the targeting base.

In FIG. 5, a second embodiment of the targeting tool 12 is illustrated. In this embodiment, the work piece 10 is a tubular (or cylindrical) member and the targeting tool 12 further comprises a second base 20', and the base 20 and the second base 20' are releasably clamped about the tubular work piece 10. Also, the base 20 and the second 20' base may be affixed about the tubular member, so that the posts 22 of each base are aligned. In this embodiment, the no drill guide 24 may used.

Figure 6:
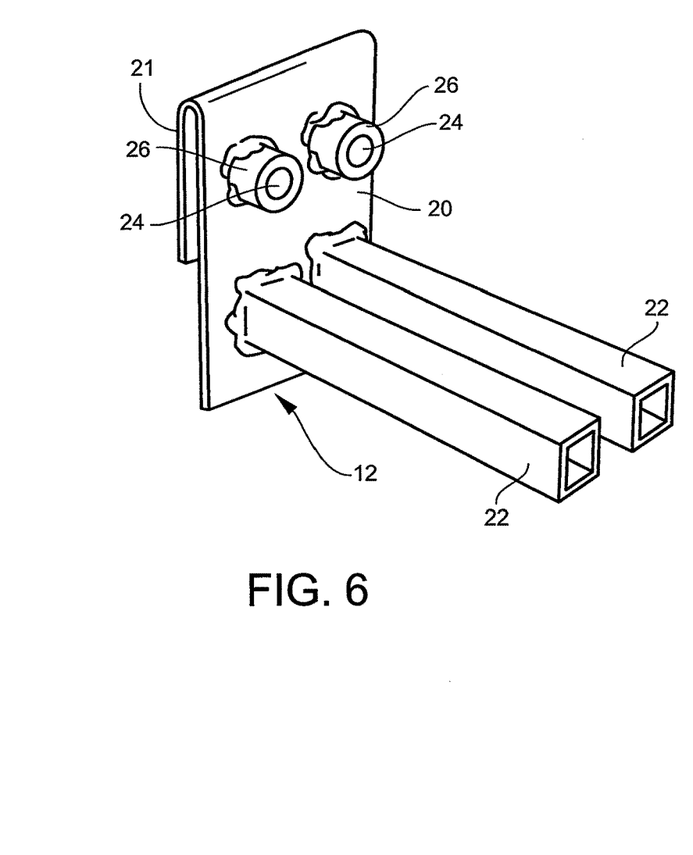
FIG. 6 shows another embodiment of the targeting base.
Figure 7:
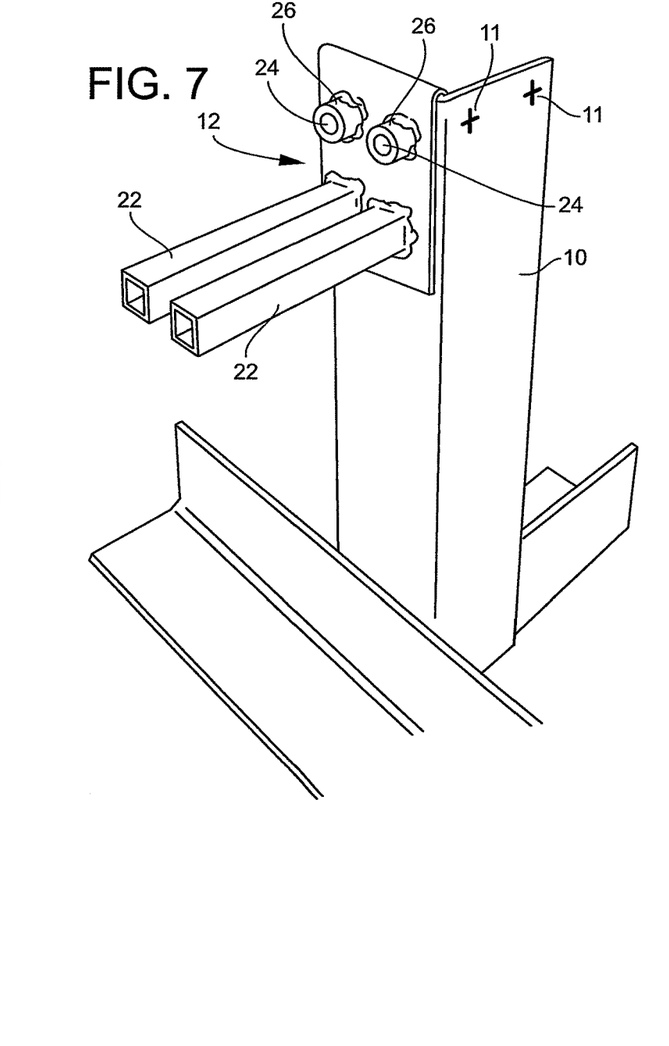
FIG. 7 shows how the embodiment of FIG. 6 may be placed on a work piece.

In FIGS. 6-7, a third embodiment of the targeting tool 12 is illustrated. In this embodiment, the base 20 includes a hook member 21 for sliding over an end of the work piece 10. Also, multiple posts 22 are illustrated. This embodiment may be used for pattern drilling at an end of the work piece 10.

Figure 8:
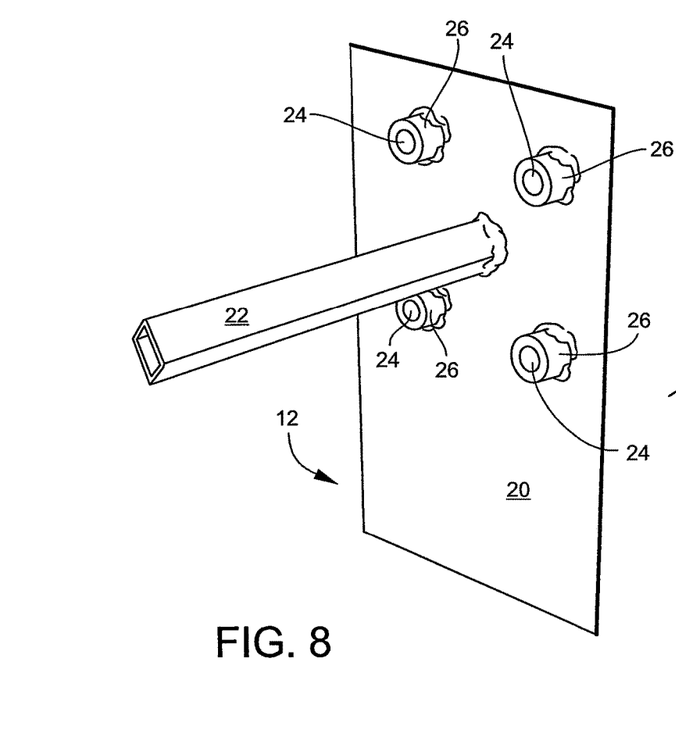
FIG. 8 shows another embodiment of the targeting base.

In FIG. 8, a fourth embodiment of the targeting tool 12 is illustrated. In this embodiment, multiple drill guides 24 are illustrated (the position of the multiple drill guides is not limiting). This embodiment may be used for pattern drilling.

Figure 9:
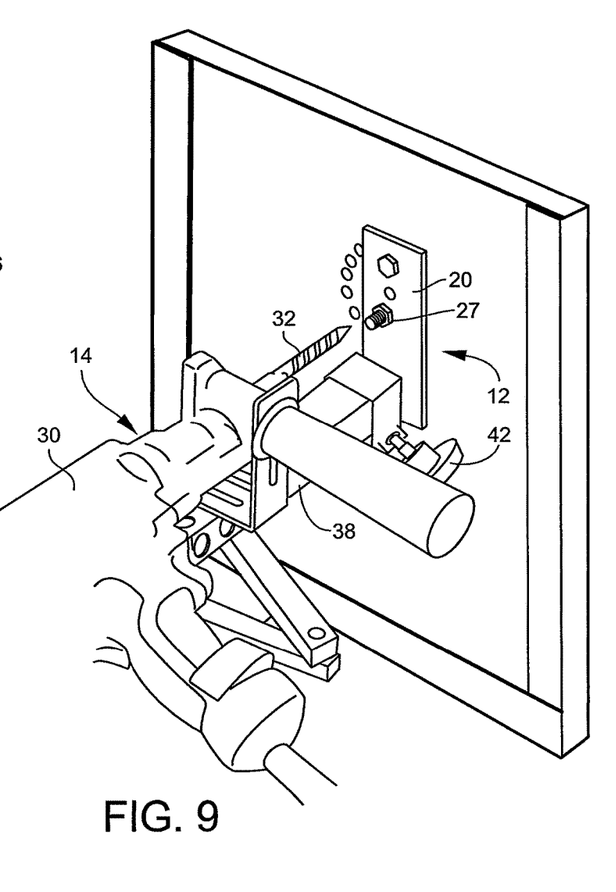
FIG. 9 shows another embodiment of the targeting base affixed to a work piece.
Figure 10:
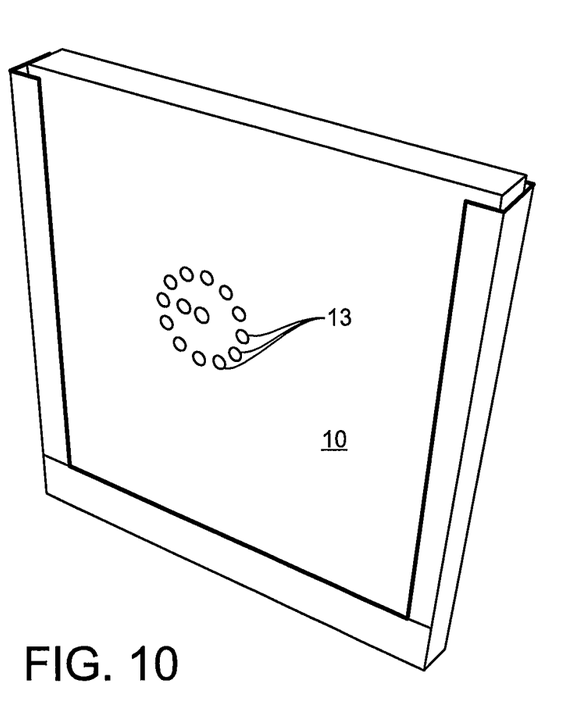
FIG. 10 shows the work piece after drilling as shown in FIG. 9.

In FIGS. 9-10, a fifth embodiment of the targeting tool 12 is illustrated. In this embodiment, the base 20 is pivotally mounted to the work piece 10, and the base 20 may be a flat member with a base pivot 27 releasably affixed to the work piece 10. This embodiment may be used to make a knockout (for making large (i.e., >1" diameter holes) in the work piece 10.

The present invention may be embodied in other forms without departing from the spirit and the essential attributes thereof, and, accordingly, reference should be made to the appended claims, rather than to the foregoing specification, as indicating the scope of the invention.

I claim:

1. A targeting tool for a portable drill press having a drill with a drill bit where the targeting tool releasably holds the drill press on a work piece for drilling a hole in the work piece comprises:
    a portable drill press includes
        a tubular column having a square, circular, or rectangular cross-section and having an open bottom end and a column clamp located adjacent the open end,
        a slide telescopes over the tubular column for moving up and down along the length of the tubular column, the slide having a slot extending along a length of the slide, but does not extend the entire length of the slide, the slide having a front face and a rear face,
        a drill mount disposed on a front face of the slide and including a fixed bracket and a mount clamp, the mount clamp located above the fixed bracket, whereby the portable drill is removably mounted between the mount clamp and the fixed bracket with the drill bit pointed in a direction of the open end, and
        a mechanical advantage device disposed on the rear face of the slide, the mechanical advantage device moves the slide up and down along the tubular column, the mechanical advantage device has a pair of lever arms, a first pivot fixedly interconnecting the pair of lever arms to the tubular column thorough the slot in the slide, and a second pivot fixedly interconnecting the lever arms to the slide below the slot in the slide, whereby moving the lever arms moves the slide up and down along the column; and
    a targeting base includes
        a base for releasable engagement with the work piece,
        a post affixed to the base, the post standing upright on the base, the tubular column and telescoping slide telescope over the post, the post is adapted to sliding engagement, via action of the mechanical advantage device, with the open end of the tubular column and the column clamp releasably fixing the post in the tubular column, and
        a drill guide is a guide hole in the base through which the drill bit passes as the slide moves up and down along the tubular column and/or a slidable rod mounted in the base.

2. The targeting tool of claim 1 wherein the guide hole further includes a guide bushing affixed to the base, and located between the base and the drill.

3. The targeting tool of claim 1 wherein the targeting tool has more than one post.

4. The targeting tool of claim 1 wherein the targeting tool has more than one drill guide.

5. The targeting tool of claim 1 wherein the base includes a base slot and the post straddles the base slot, and the base slot receives a work piece clamp that releasably affixes the base to the work piece.

6. The targeting tool of claim 1 wherein the work piece is a tubular member and the targeting tool further comprises a second targeting base, and the targeting base and the second targeting base are releasably clamped about the tubular member.

7. The targeting tool of claim 6 wherein the targeting base and the second targeting base are affix about the tubular member so that the posts of each targeting base are aligned.

8. The targeting tool of claim 1 wherein the base includes a hook member for sliding over the work piece.

9. The targeting tool of claim 1 wherein the base is pivotally mounted to the work piece, and the base is a flat member with a base pivot releasably affixed to the work piece.

* * * * *